United States Patent [19]

Rudnick

[11] Patent Number: 5,760,874
[45] Date of Patent: Jun. 2, 1998

[54] METHOD AND APPARATUS FOR DISPLAYING MOTION PICTURES

[76] Inventor: Michael I. Rudnick, 312 Texas St., San Francisco, Calif. 94107

[21] Appl. No.: 781,355

[22] Filed: Jan. 21, 1997

[51] Int. Cl.$^6$ .................................................. G03B 25/00
[52] U.S. Cl. ........................................................ 352/101
[58] Field of Search ............................ 352/101, 102, 352/103, 108, 117

[56] References Cited

U.S. PATENT DOCUMENTS

| | | |
|---|---|---|
| 972,344 | 10/1910 | Davis . |
| 1,014,365 | 1/1912 | Bourgin . |
| 1,646,341 | 10/1927 | Baradat . |
| 1,925,136 | 9/1933 | Conover . |
| 1,974,423 | 9/1934 | Holst et al. . |
| 2,004,120 | 6/1935 | Leventhal . |
| 2,013,661 | 9/1935 | Leventhal . |
| 2,168,433 | 8/1939 | Parvopassu . |
| 2,476,504 | 7/1949 | Maytum . |
| 2,860,542 | 11/1958 | Kudar . |
| 3,259,448 | 7/1966 | Whitley et al. . |
| 3,640,019 | 2/1972 | Jones et al. ............................... 46/49 |

FOREIGN PATENT DOCUMENTS

| 4244 | of 1877 | United Kingdom .................... 352/101 |
|---|---|---|

*Primary Examiner*—Russell E. Adams
*Attorney, Agent, or Firm*—Blakely, Sokoloff, Taylor & Zafman, L.L.P.

[57] ABSTRACT

A method and an apparatus for displaying motion pictures. In one embodiment, a substantially transparent and faceted cylindrical body includes a series of motion picture images imprinted on each one of the facets of the cylindrical body. When the cylindrical body is rotated about the longitudinal axis of the cylindrical body, the images on the opposite side of the cylindrical body to a viewer are observed through the interior of the cylindrical body through the facets of the cylindrical body near the viewer. When the cylindrical body is rotated about its longitudinal axis, the facets of the cylindrical body wipe across in front of the images behind the facets on the opposite side of the cylindrical body such that each image is dissolved into a neighboring or an adjacent one of the series of motion picture images to produce an animated effect.

20 Claims, 7 Drawing Sheets

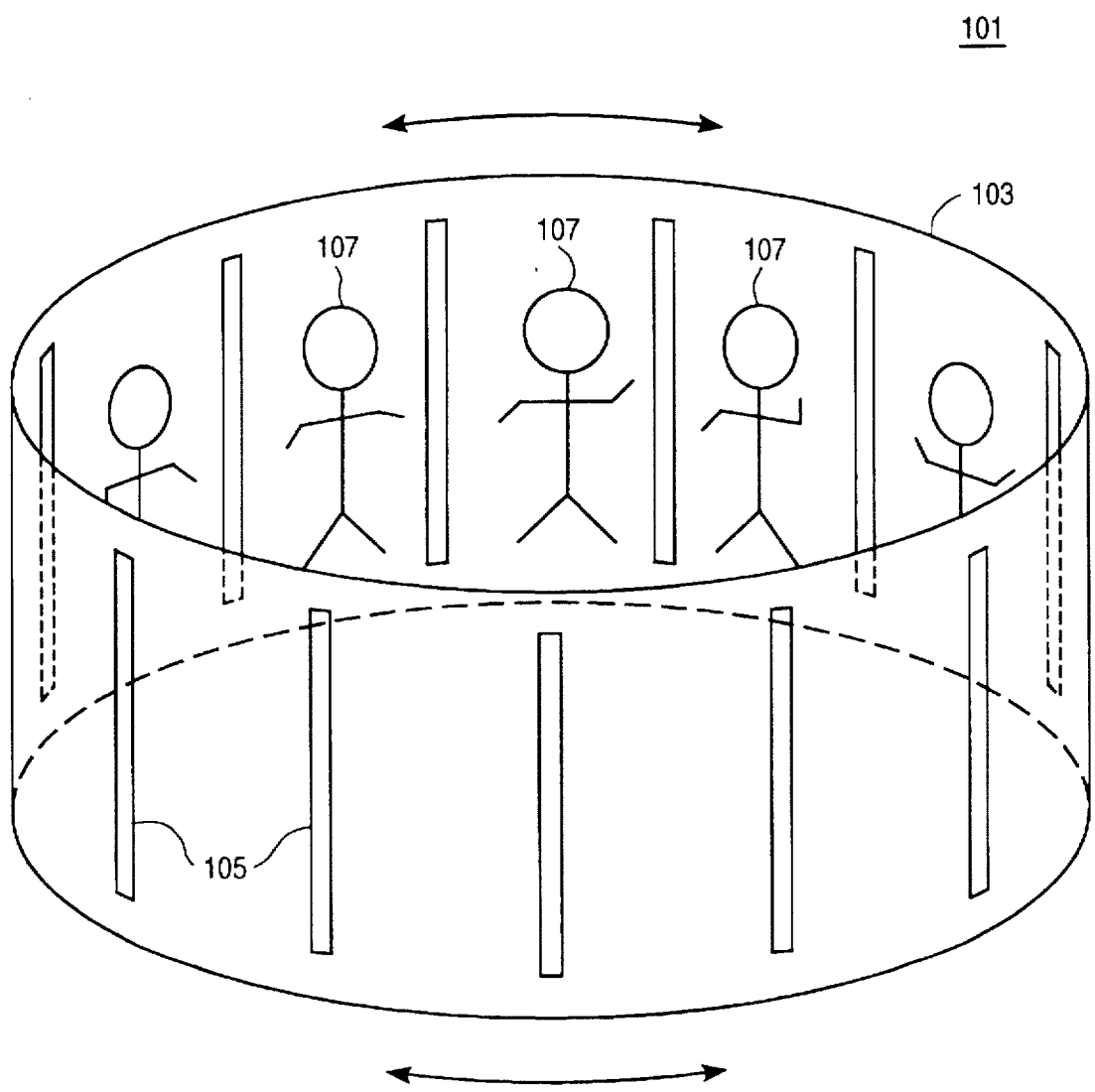
FIG_1A (PRIOR ART)

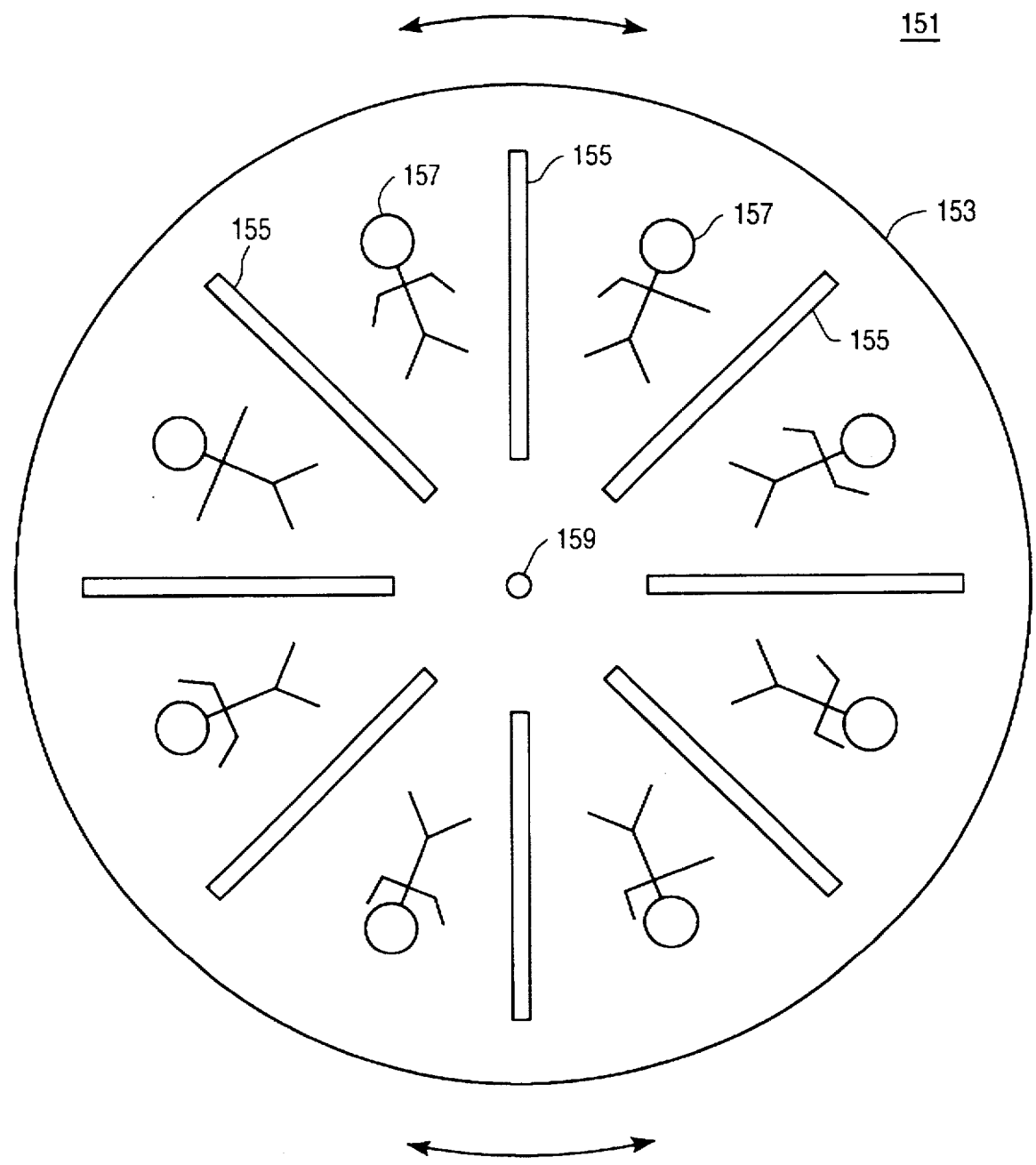
FIG_1B (PRIOR ART)

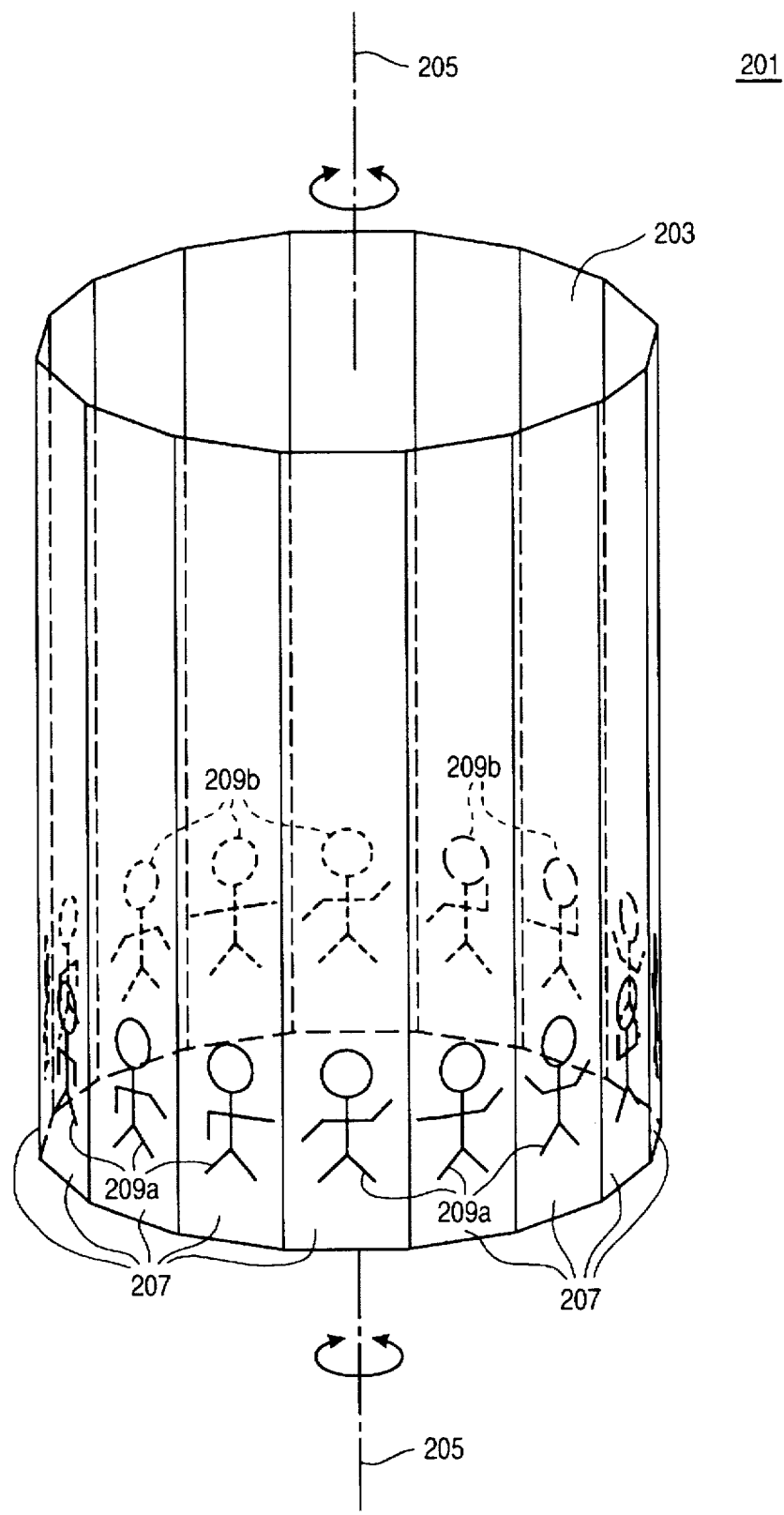
FIG_2

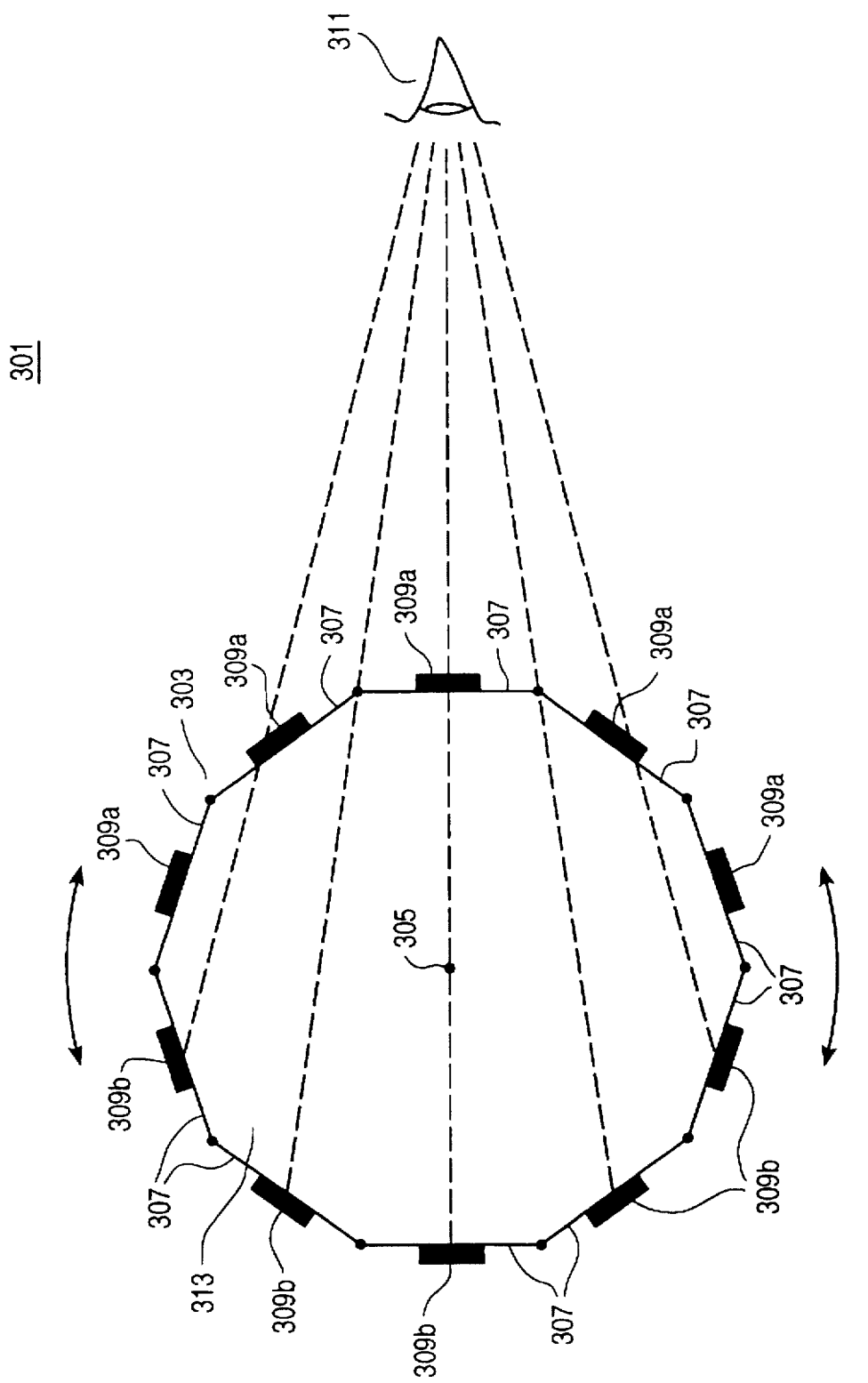
FIG_3

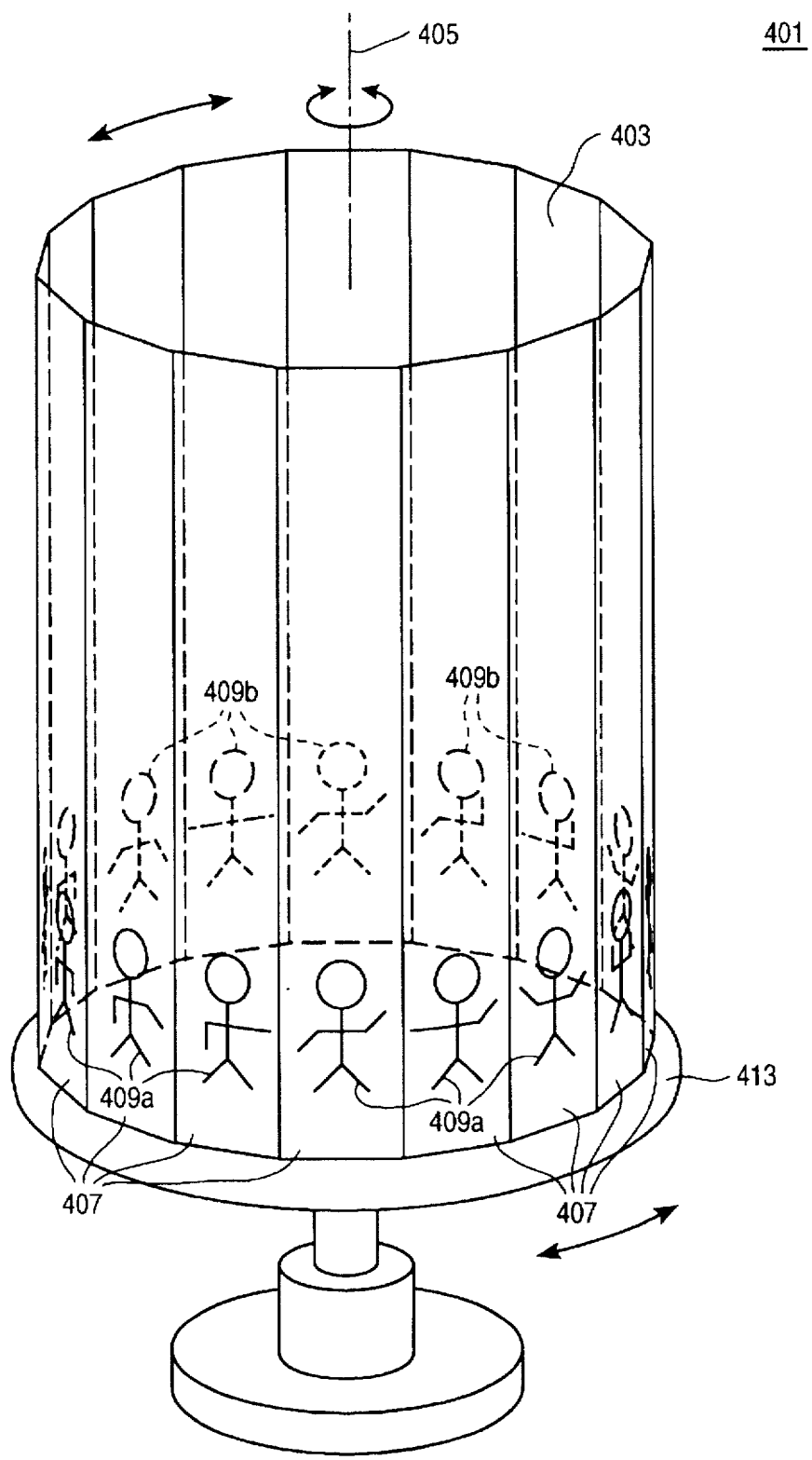
FIG_4

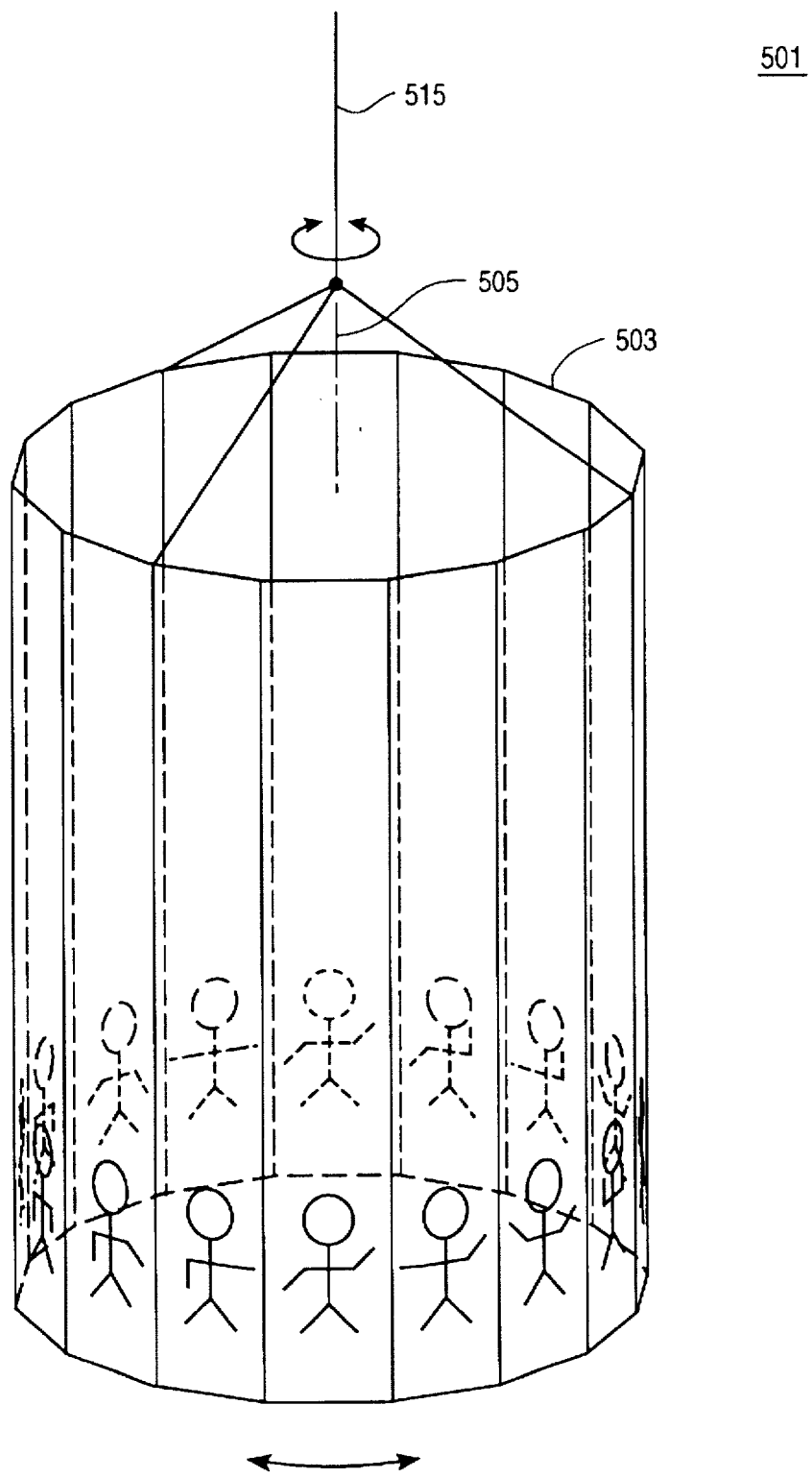
FIG_5

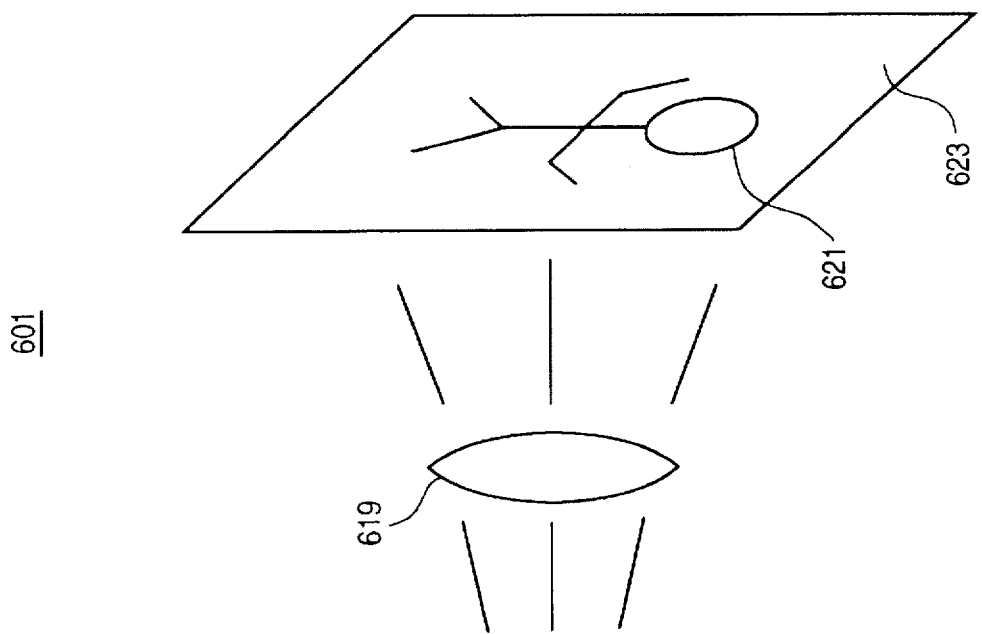
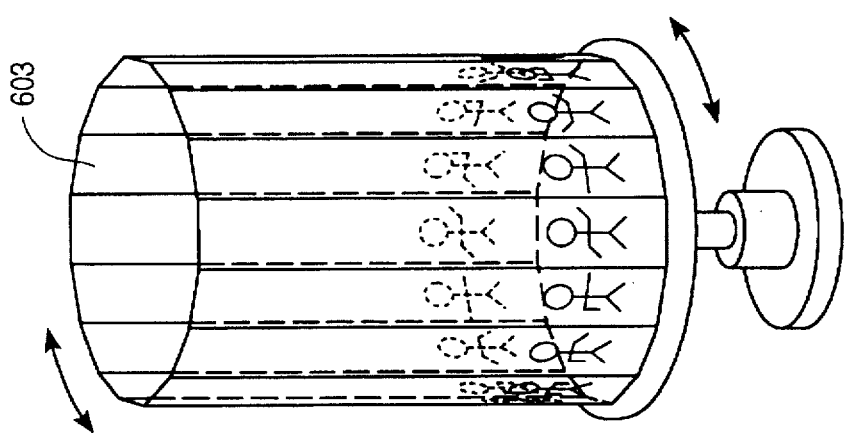
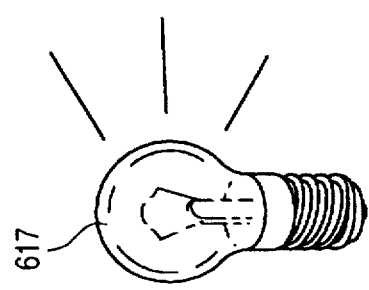
FIG_6

METHOD AND APPARATUS FOR DISPLAYING MOTION PICTURES

BACKGROUND OF THE INVENTION

1. Field of the Invention

The present invention relates generally to motion pictures and, more specifically, the present invention relates to devices and methods for viewing motion pictures.

2. Description of the Related Art

Typical animated picture technology commonly utilizes cameras and projectors which utilize motion picture film. As is well known in the art, motion picture film is generally a celluloid substance that includes a series of motion picture images, which when viewed in succession create an animated image effect. In general, motion picture film is fed through the camera or projector using an elaborate series of rollers, guides, sprockets, gears and pulleys. In addition, complex shutter mechanisms having complicated pull down systems are commonly utilized to dissolve the successive images of the motion picture film into one another.

Due to the requirements and complexities of the mechanisms that accompany the utilization of motion picture film in animated image technology, animated picture technology is relatively expensive and has therefore been generally impractical for many simple items. Accordingly, there is a desire to eliminate the need for motion picture film when producing inexpensive items that include animated image technology. By eliminating the need for motion picture film, and thereby reducing the complexity of a motion picture display device, animated images become more practical and attainable for low cost items. Furthermore, a motion picture display device that does not employ motion picture film, and therefore does not need to include the elaborate mechanisms necessary to guide the film, will therefore have reduced complexity, which will result in the motion picture display device having increased durability.

FIGS. 1A and 1B illustrate two prior art devices that employ animated image technology without the use of motion picture film in simple and inexpensive items. Each of the devices illustrated in FIGS. 1A and 1B create moving pictures with interruptions in the vision that are caused by the passage of slits in rotating objects across the line of vision.

For instance, FIG. 1A is an illustration of a prior art motion picture display device 101, which includes an opaque band 103 having slits 105 spaced apart at regular periodic intervals. A series of motion picture images 107 are printed on the inside of band 103 such that when band 103 is rotated, motion picture images 107 appear to be animated when viewed through slits 105.

FIG. 1B illustrates a prior art motion picture display device 151 that includes an opaque rotating disk 153 having slits 155 arranged in a periodic regular fashion extending radially from the center 159 of disk 153. A series of motion picture images 157 are printed on disk 153 in between slits 155. Animated images are viewed using motion picture display device 151 by observing images 157 through slits 155 by spinning disk 153 about center 159 in front of a mirror (not shown). When observing images 157 through slits 155 in the reflection of a mirror, images 157 will appear to be in motion.

As can be appreciated by those skilled in the art, the prior art motion picture display devices illustrated in FIGS. 1A and 1B have the disadvantage of limiting the observation of motion picture images 107 and 157 through slits 105 or 155 respectively. Consequently, the eye of an observer must be positioned relatively near slits 105 or 155 to view animated images. As a result, there is a severely limited viewing angle when observing motion picture images. In addition, devices 101 and 151 require relatively large amounts of light to comfortably view the motion picture images 107 and 157 since slits 105 and 155 transmit a relatively small percentage of light as band 103 and disk 153 are rotated. Specifically, as slits 105 and 155 become narrower, the percentage light transmitted through slits 105 and 155 becomes smaller correspondingly.

Another disadvantage associated with the motion picture display devices as illustrated in FIGS. 1A and 1B is that as the rotation speed of the band 103 and disk 153 becomes very slow, the animated effect is lost since images 107 and 157 come into view very infrequently. In particular, the frequency at which slits 105 and 155 are in front of a viewers eye, and thus the frequency at which motion picture images 107 and 157 are in view becomes very low. As a consequence, slow motion animated image display is severely limited when using the prior art motion picture display devices shown in FIGS. 1A and 1B. Furthermore, a disadvantage associated with motion picture display device 101 is that with the very limited viewing angle through slits 105, only one to two animated motion pictures images may be observed simultaneously at any time.

Therefore what is desired is a motion picture display device that allows a viewer to observe motion picture images from a wide variety of viewing angles in a wide variety of lighting conditions. Such a motion picture display device would enable an observer to view more than one to two motion picture display images simultaneously. Moreover, such a device would be able to provide a slow motion animated image effect without sacrificing motion picture quality. Finally, such a method and apparatus should be readily implemented in a device without the need for film nor the complex and elaborate mechanisms associated with the use of motion picture film.

SUMMARY OF THE INVENTION

A method and an apparatus for displaying motion pictures is disclosed. In one embodiment, a substantially transparent and cylindrical body having a plurality of facets arranged around an exterior of the cylindrical body is provided. Each one of a series of images is disposed substantially near a corresponding facet on the cylindrical body such that each one of the series of images is visible through the interior of the cylindrical body through at least one of the plurality of facets. The cylindrical body is configured to be rotated about the longitudinal axis of the cylindrical body such that each one of the series of images dissolves into an adjacent one of the series of images when viewed through the interior of the cylindrical body and through the plurality of facets of the rotating cylindrical body. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

FIG. 1A is an illustration of a prior art motion picture display device employing slits in a rotating band.

FIG. 1B is an illustration of a prior art motion picture display device employing slits in a rotating disk.

FIG. 2 is a perspective view of a motion picture display device in accordance with the teachings of the present invention.

3

FIG. 3 is a top view of a motion picture display device in accordance with the teachings of the present invention.

FIG. 4 is a perspective view of a motion picture display device with a rotatable base in accordance with the teachings of the present invention.

FIG. 5 is a perspective view of a motion picture display device with a rotatable top in accordance with the teachings of the present invention.

FIG. 6 is an illustration of a motion picture display device used to project an animated image on a projection screen in accordance with the teachings of the present invention.

DETAILED DESCRIPTION

A method and an apparatus for displaying motion pictures is disclosed. In the following description numerous specific details are set forth in order to provide a thorough understanding of the present invention. It will be apparent however to one having ordinary skill in the art that the specific detail need not be employed to practice the present invention. In other instances well known material or methods have not been described in detail in order to avoid obscuring the present invention.

The present invention provides a method and an apparatus for displaying motion pictures by providing a series of motion picture designs or images that are imprinted or closely positioned to each facet of a faceted transparent cylinder, which when rotated produces an animated effect for display or projection. The rotating facets of the present invention wipe across each one of the series of motion picture images in view behind the facets resulting in each motion picture image dissolving into adjacent motion picture image when viewed through the facets of the rotating cylinder of the present invention. The rotating cylinder of the present invention may be rotated at practically any speed to provide very effective slow or fast motion animation. The present invention also provides motion pictures in a wide variety of lighting conditions in which all images viewed through the interior of the cylinder are animated. The images animated with the present invention can be viewed from a large number of angles and from any practical distance.

FIG. 2 shows a perspective view of one embodiment of the present invention 201 that includes a substantially transparent and cylindrical body 203 having a longitudinal axis 205. A plurality of facets 207 are arranged around the exterior of cylindrical body 203 as shown in FIG. 2. A series of images 209A and 209B are disposed on or disposed substantially near the surface of each facet 207 on cylindrical body 203. For the purpose of illustration, the series of images 209B shown in the perspective drawing of FIG. 2 are visible through the inside of cylindrical body 203 through the facets 207 around the exterior of cylindrical body 203. The series of images 209A are directly visible on the surface of cylindrical body 203 without having to look through the interior of cylindrical body 203.

When cylindrical body 203 is rotated about its longitudinal axis 205, each one of the facets 207 successively wipes across each one of the series of images 209B behind facets 207 such that each one of the images 209B dissolves into neighboring or an adjacent one of the series of images 209B resulting in an animated effect. That is, when images 209B are viewed through the interior of cylindrical body 203 through the facets 207, a motion picture effect is produced when cylindrical body 203 is rotated about longitudinal axis 205.

It is appreciated that there is no animated effect when viewing the series of images 209A that are on the near side of cylindrical body 203 facing an observer since facets 207 do not wipe across in front of the series of images 209A and since these images are therefore not viewed through the interior of cylindrical body 203.

In one embodiment of the present invention, the series of images 209A and 209B are fixedly attached directly to the surface of each of the facets 207 of cylindrical body 203. Some methods for applying images 209A and 209B directly to the facets 207 of cylindrical body 203 include well known techniques such as but not limited to painting, printing, etching, the application of decals, or the like. In another embodiment of the present invention, the series of images 209A and 209B may be objects that are merely positioned substantially near the surface of each facet 207 using well known techniques so long as images 209B may be viewed through the interior of cylindrical body 203 through facets 207.

FIG. 3 shows a top view of another embodiment of the present invention 301 including a substantially cylindrical body 303 having a longitudinal axis 305. A plurality of facets 307 are arranged around the exterior of cylindrical body 303 as shown in FIG. 3. A series of images 309A and 309B are disposed on or near each facet 307 of cylindrical body 303. For the purpose of illustration, images 309A are on the side of cylindrical body 303 near an observer 311. Images 309B are on the side of cylindrical body 303 opposite observer 311 such that images 309B are viewed through the interior 313 of cylindrical body 303 through facets 307 to viewer 311.

When cylindrical body 303 is rotated about longitudinal axis 305, each one of the facets 307 successively wipes across images 309B behind facets 307 such that a motion picture effect is produced since each one of images 309B dissolves into a neighboring or an adjacent one of the series of images 309B as facets 307 wipe across in front of images 309B to the viewer 311.

In one embodiment of the present invention, cylindrical body 303 includes ten facets 307. It is appreciated that cylindrical body 303 may have more or less facets and a motion picture effect will still be produced in accordance with the teachings of the present invention. Moreover, it is noted that cylindrical body 303 may have an odd or even number of facets 307 and a motion picture effect will still be produced so long as images 309B are viewed through the interior 313 of cylindrical body 303 and that facets 307 wipe across in front of images 309B when cylindrical body 303 is rotated about longitudinal axis 305.

When cylindrical body 303 is rotated quickly, a fast motion picture effect is produced. When cylindrical body 303 is rotated slowly, a slow motion picture effect is produced. In addition, it is noted that a motion picture effect is observed when viewing any of images 309B through the interior 313 of cylindrical body 303. Therefore, the more images 309B that are viewed through the interior 313 of cylindrical body 303, the more simultaneous motion picture images that can be viewed. In the embodiment shown in FIG. 3, five simultaneous motion picture images 309B can be observed by observer 311. This number of simultaneous motion picture images can be varied depending on the total number of facets 307 that are included around the exterior of cylindrical body 303.

It is appreciated that animated images 309B can be observed at virtually any practical angle at which observer 311 can view images 309B through the interior 313 and through facets 307 of cylindrical body 303. As cylindrical body 303 is rotated, each image 309B dissolves into the next image when viewed through facets 307 and that the motion picture effect is sharp and steady. Furthermore, is it noted that observer 311 can view the motion picture effect in images 309B in practically any lighting condition so long as images 309B are in view through the interior 313 through facets 307 of cylindrical body 303.

In one embodiment of the present invention, cylindrical body 303 is a container, such as but not limited to a cup, jar, bottle, or the like and constructed out of substantially transparent glass, crystal, plastic or the like. In another embodiment of the present invention, cylindrical body 303 is a container filled with a substantially transparent liquid, such as but not limited to water. In yet another embodiment of the present invention, it is appreciated that the edges between each facet 307 are as sharp as practically possible so as to maintain high animated picture quality as facets 307 wipe across in front of images 309B when cylindrical body 303 is rotated. It is appreciated that if the edges between facets 307 are excessively gradual, an undesired blurring effect is produced as facets 307 wipe across in front of each image 309B when cylindrical body 303 is rotated.

FIG. 4 is a perspective view of another embodiment of the present invention 401 that includes a cylindrical body 403 in accordance with the teachings of the present invention. As shown in FIG. 4, cylindrical body 403 is attached to a rotatable base 413. In one embodiment of the present invention, rotatable base 413 is a rotatable coaster, lazy susan, or any other similar type of rotatable pedestal. In another embodiment of the present invention, rotatable base 413 is motorized using well known techniques such that cylindrical body 403 can be rotated to provide animated images 409B for an indefinite period of time. In yet another embodiment of the present invention, cylindrical body 403 includes a small protrusion (now shown) on the bottom of cylindrical body 403 along longitudinal axis 405 such that cylindrical body 403 can be easily rotated on a hard surface, similar to for example a table top. As a result, cylindrical body 403 can be spun about longitudinal axis 405 and the rotation can be sustained such that the animated effect of images 409B can be observed for an appreciable length of time.

It is appreciated that although the longitudinal axis 405 of cylindrical body 403 has generally been described and illustrated herein in a vertical orientation, the longitudinal axis 405 of cylindrical body 403 may also be horizontally oriented in accordance with the teachings of the present invention with similar motion picture results in images 409B.

FIG. 5 is a perspective view of another embodiment 501 of the present invention including a cylindrical body 503 having longitudinal axis 505 in accordance with the teachings of the present invention. The embodiment 501 shown in FIG. 5 is similar to the embodiment 401 shown in FIG. 4 with the exception of the embodiment 501 including a rotatable top 515 instead of a rotatable base 413. In one embodiment of the present invention, cylindrical body 503 is supported with a rotatable structure 515 that allows cylindrical body 503 to be rotated about longitudinal axis 505. In one embodiment of the present invention, cylindrical body 503 is a substantially transparent and faceted object attached to a rotatable top 515 using well known techniques as part of a rotatable fixture, such as but not limited to a lamp shade, ceiling fan, holiday ornament, music box, sign, window display, or the like.

FIG. 6 is an illustration of yet another embodiment 601 of the present invention including a substantially transparent and faceted rotatable cylindrical body 603 in accordance with the teachings of the present invention. In the embodiment shown in FIG. 6, an animated image 621 is projected onto a projection screen 623 with cylindrical body 603 positioned between a light source 617 and a lens 619. Lens 619 is configured to focus motion picture image 621 onto projection screen 623 by focusing a light generated from light source 617 that is transmitted through cylindrical body 603.

Thus, what has been described is a method and an apparatus for displaying a motion picture. With the presently described motion picture display device, motion pictures can be displayed without the use of film, shutters and the other complex and expensive mechanisms that generally accompany the use of film. With the presently described invention, a plurality of motion picture images can be viewed through the presently described rotating cylinder. The motion picture images can be appreciated from virtually all angles, from any distance, and in a wide variety of lighting conditions. With the presently described invention, animation can be viewed at any practical speed to produce effective slow and fast motion animation.

In the foregoing detailed description, the method and the apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A motion picture display device, comprising:

a substantially transparent and cylindrical body having a longitudinal axis, an interior, an exterior and a plurality of facets arranged around the exterior of the cylindrical body; and a series of images, each one of the series of images being disposed substantially near a corresponding facet such that each one of the series of images is visible through the interior of the cylindrical body and through at least one of the plurality of facets;

wherein the cylindrical body is configured to be rotated about the longitudinal axis such that each one of the series of images dissolves into an adjacent one of the series of images when viewed through the interior of the cylindrical body through the plurality of facets of the cylindrical body.

2. The motion picture display device described in claim 1 wherein a plurality of the series of images is visible through the interior of the cylindrical body and through the plurality of facets of the cylindrical body.

3. The motion picture display device described in claim 1 wherein each one of the series of images is fixedly attached directly to the corresponding facet.

4. The motion picture display device described in claim 1 wherein each one of the series of images is etched directly in the corresponding facet.

5. The motion picture display device described in claim 1 wherein each one of the series of images is an object positioned substantially near the corresponding facet.

6. The motion picture display device described in claim 1 further comprising:

a light source positioned near the cylindrical body; and a lens positioned near the cylindrical body, the cylindrical body being positioned between the light source and the lens, the lens configured to focus one of the series of images onto a projection surface.

7. The motion picture display device described in claim 1 further comprising a rotatable base.

8. The motion picture display device described in claim 1 further comprising a rotatable top.

9. The motion picture display device described in claim 1 wherein the cylindrical body is a container.

10. The motion picture display device described in claim 9 wherein the container contains a substantially transparent substance.

11. A method for viewing motion pictures comprising the steps of:

provining a substantially transparent and cylindrical body having a longitudinal axis, an interior, an exterior and a plurality of facets arranged around the exterior of the cylindrical body;

disposing each one of a series of images substantially near a corresponding facet such that each one of the series of images is visible through the interior of the cylindrical body and through at least one of the plurality of facets; and rotating the cylindrical body about the longitudinal axis such that each one of the series of images dissolves into an adjacent one of the series of images when viewed through the interior of the cylindrical body and through the plurality of facets of the rotating cylindrical body.

12. The method described in claim 11 wherein a plurality of the series of images is visible through the interior of the cylindrical body and through the plurality of facets of the rotating cylindrical body.

13. The method described in claim 11 wherein the step of disposing each one of the series of images substantially near the corresponding facet includes the step of fixedly attaching each one of the series of images directly to the corresponding facet.

14. The method described in claim 11 wherein the step of disposing each one of the series of images substantially near the corresponding facet includes the step of etching each one of the series of images directly in the corresponding facet.

15. The method described in claim 11 wherein the step of disposing each one of the series of images substantially near the corresponding facet includes the step of positioning each one of a series of objects substantially near the corresponding facet.

16. The method described in claim 11 including the additional steps of:

illuminating the cylindrical body; and focusing one of the series of images onto a projection surface.

17. The method described in claim 11 wherein the cylindrical body is a container.

18. The method described in claim 17 including the additional step of filling the container with a substantially transparent substance.

19. A motion picture display device, comprising:

means for providing a substantially transparent and cylindrical body having a longitudinal axis, an interior, an exterior and a plurality of facets arranged around the exterior of the cylindrical body;

means for disposing each one of a series of images substantially near a corresponding facet such that each one of the series of images is visible through the interior of the cylindrical body and through at least one of the plurality of facets; and means for rotating the cylindrical body about the longitudinal axis such that each one of the series of images dissolves into an adjacent one of the series of images when viewed through the interior of the cylindrical body and through the plurality of facets of the rotating cylindrical body.

20. The motion picture display device described in claim 19 further comprising:

means for illuminating the cylindrical body; and means for focusing one of the series of images onto a projection surface.

* * * * *